United States Patent [19]

Hayata

[11] Patent Number: 5,115,878
[45] Date of Patent: May 26, 1992

[54] HOOD STRUCTURE FOR A VEHICLE

[75] Inventor: Ryoji Hayata, Hiroshima, Japan

[73] Assignee: Mazda Motor Corporation, Hiroshima, Japan

[21] Appl. No.: 558,000

[22] Filed: Jul. 26, 1990

[30] Foreign Application Priority Data

Jul. 26, 1989 [JP] Japan .................. 1-87579[U]

[51] Int. Cl.⁵ .................................. B62D 25/10
[52] U.S. Cl. .......................... 180/69.21; 296/189
[58] Field of Search ............ 180/69.21, 69.2, 89.17; 296/901, 191, 188, 189; 49/381, 399

[56] References Cited

U.S. PATENT DOCUMENTS

| 3,938,610 | 2/1976 | Harman | 180/69.21 |
| 4,579,185 | 4/1986 | Wakasa | 180/69.21 X |
| 4,634,167 | 2/1987 | Moriki et al. | 180/69.2 X |

FOREIGN PATENT DOCUMENTS

| 2238676 | 2/1974 | Fed. Rep. of Germany | 296/189 |
| 3438356 | 4/1986 | Fed. Rep. of Germany | 180/69.2 |
| 2383059 | 11/1978 | France | 296/188 |
| 60-165267 | 11/1985 | Japan | |

Primary Examiner—Andres Kashnikow
Assistant Examiner—Michael Mar
Attorney, Agent, or Firm—Fleit, Jacobson, Cohn, Price, Holman & Stern

[57] ABSTRACT

An impact absorbing hood structure for a front hood is located between a front end and a windshield of a vehicle. The hood includes both an outer panel and an inner panel secured to the outer panel. A laterally extending indentation is provided in a central region of the inner panel of the hood. The indentation divides the front hood longitudinally into a stronger part between the windshield and the indentation and a weaker part between the vehicle front end and the indentation. The stronger part has a higher rigidity than the weaker part so that the front hood is bent and folded by a crash impact at the indentation. Impact force is, therefore, entirely absorbed by the weaker part of the hood, and the stronger part of the hood prevents the hood from contacting and breaking the windshield of the vehicle.

2 Claims, 5 Drawing Sheets

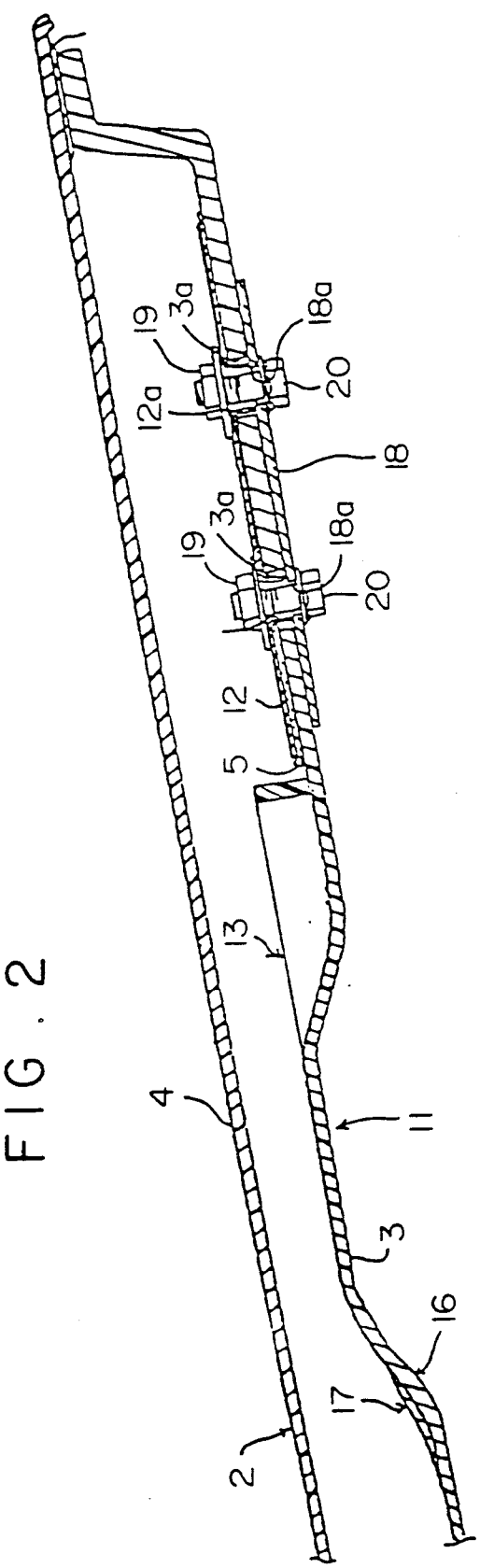

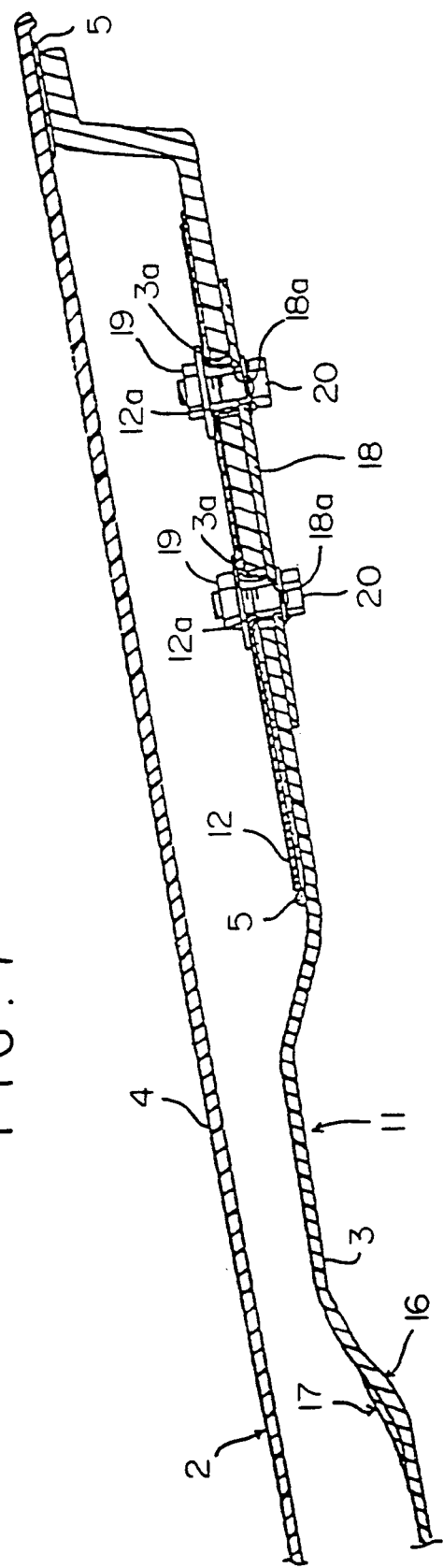

HOOD STRUCTURE FOR A VEHICLE

BACKGROUND OF THE INVENTION

1. Field of the Invention

This invention relates to a hood structure for a vehicle and, in particular, to a hood structure suitable for use in hoods constructed of plastic.

2. Description of Related Art

Conventionally, the front hood of a vehicle has been formed of metal. For the purpose of reducing the weight of the vehicle, however, it is known to use a plastic hood structure in place of a conventional metal vehicle hood. Japanese Utility Model Application 60-165267 discloses one such plastic hood structure. The plastic hood structure of this publication is equipped with diagonal ribs forming a crisscrossed reinforcing frame on the whole inner surface thereof. Because of this reinforcing frame, the plastic hood structure has the same strength as that of a hood formed of iron, steel or similar metal or metal alloy. However, the plastic hood disclosed by this publication does have problems similar to those present in conventionally constructed metal hoods. Most significantly, in a head on car crash, the hood disclosed by the Japanese publication has a tendency to move in a rearward direction of the vehicle and break the front windshield.

To prevent the plastic hood from impacting upon and breaking the front windshield of the vehicle, the hood of the Japanese publication is equipped with a fold region extending transversely of the hood and located in the middle region of the hood. The impact of a head-on car crash breaks the hood at the fold region and thus, the hood bends or folds in this region. The bending of the hood at the fold region helps prevent the hood from moving further rearward, breaking the front windshield, and endangering vehicle occupants.

In the event the collision produces an abnormally high impact force, however, it is possible that the impact from the crash will not be absorbed by the hood at the fold. It is, therefore, possible that the hood will bend in additional places, such as the area immediately adjacent the front windshield. If this occurs, the windshield will be broken.

SUMMARY OF THE INVENTION

The present invention is designed to prevent the hood of a vehicle from breaking the front windshield by providing the rear region of the hood structure, i.e., that region of the hood between a fold region on the hood and the windshield, with the ability to withstand a greater crash impact so that the crash impact is absorbed entirely by the area of the hood between the front end of the vehicle and the fold region in the hood. Thus, the primary object of the present invention is to improve the rigidity, or strength, of the rear region of the hood structure so that the fold region folds or breaks properly in the event of a head-on car crash.

In order to attain the above object, a hood construction which provides a stronger reinforced hood portion, or part, behind the fold region is utilized. Due to the greater strength of the rear part of the hood, i.e., that part of the hood located between the fold region and the front windshield, the impact of a crash from the front end direction of the vehicle is concentrated and absorbed by that area of the front hood between the vehicle front end and the fold. The fold thus becomes bent while the portion of the hood between the fold and the front windshield is prevented from bending and moving rearward. Thus, the front windshield is not broken and passenger safety is increased.

BRIEF DESCRIPTION OF THE DRAWINGS

The accompanying drawings show preferred embodiments of the present invention.

FIG. 2 is a side sectional view of the hood as seen in the direction of arrows II—II of FIG. 1.

FIG. 7 is a side sectional view of the hood as seen in the direction of arrows VII—VII of FIG. 6.

DETAILED DESCRIPTION OF THE PREFERRED EMBODIMENTS

Figure 1:
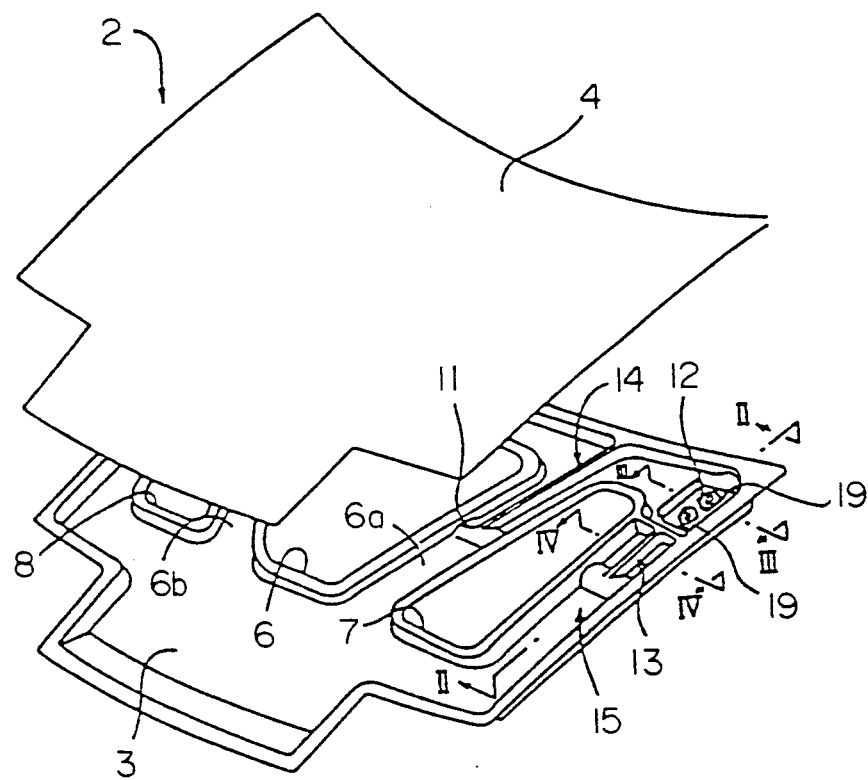
FIG. 1 is a perspective view of the whole hood structure according to a first embodiment of the present invention.
Figure 5:
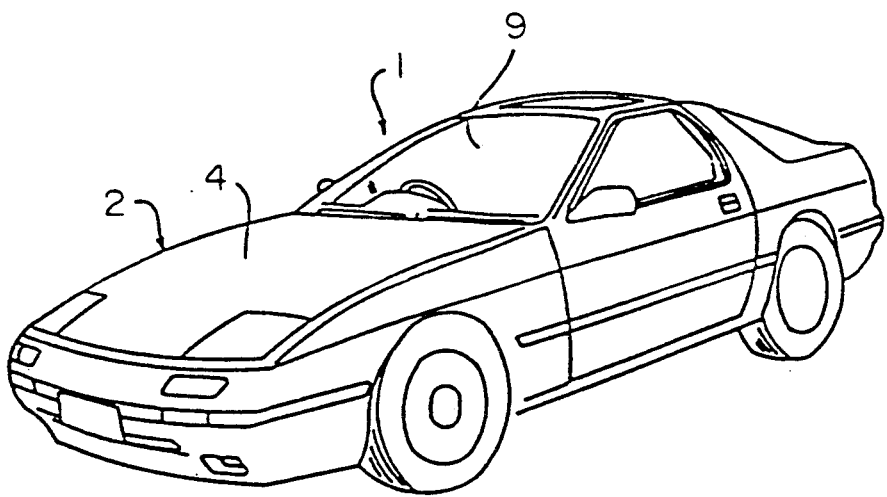
FIG. 5 is a perspective view of an entire car including a hood according to the present invention.
Figure 3:
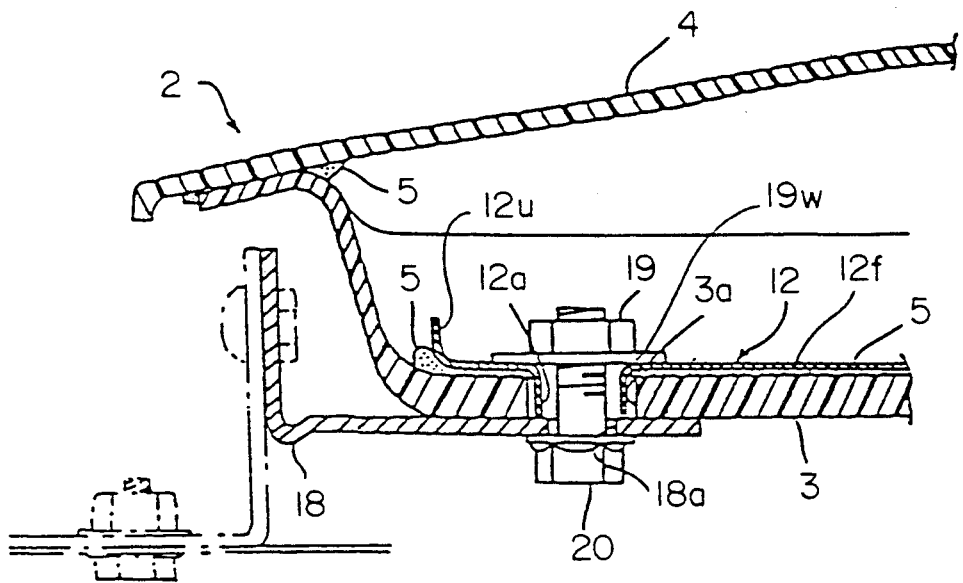
FIG. 3 is a side sectional view of the hood as seen in the direction of arrows III—III of FIG. 1.
Figure 4:
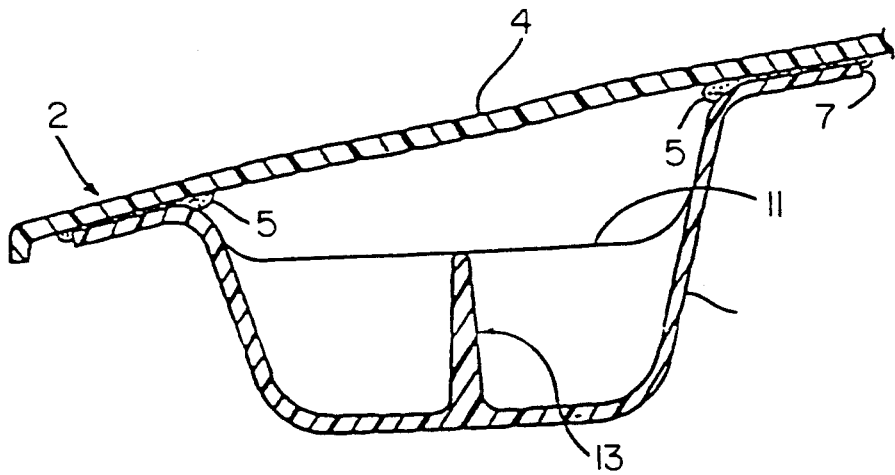
FIG. 4 is a side sectional view of the hood as seen in the direction of arrows IV—IV of FIG. 1.

FIGS. 1 to 5 show the hood structure for a vehicle according to a first embodiment of the present invention. In FIG. 5, reference numeral 1 designates, generally, the body of the vehicle, reference numeral 2 designates, generally, the front vehicle hood, reference numeral 4 designates an outer panel of the hood, and reference numeral 9 indicates a front windshield. Referring now to FIGS. 1-4, it can be seen that the front hood 2 includes a synthetic resin inner panel 3 and a synthetic resin outer panel 4. The synthetic resin inner panel 3 and the synthetic resin outer panel 4 are connected to each other by an adhesive 5, as is shown in FIGS. 3 and 4, which is provided at inner and outer peripheral contact areas between the inner and outer panels 3 and 4. The synthetic resin used as the material fastening the hood is, for example, a compound material of plastic and glasses.

The center portion of the inner panel 3 is provided with a center hole 6 of a trapezoidal, almost triangular shape. Side portions of the inner panel 3 adjacent the central hole 6 include side holes 7, 8 of a trapezoidal, almost rectangular shape. The synthetic resin inner panel 3 and the synthetic resin outer panel 4 are much thicker than metallic hood panels and have approximately the same strength as metallic hood panels. Behind the hood 2 is the front windshield 9.

Referring to FIG. 2, the impact absorbing hood structure of the present invention will now be described. From FIG. 2, it can be seen that the inner panel 3 includes a laterally extending indentation 11 molded or otherwise formed therein. The indentation 11 forms a fold region extending laterally of the inner panel, i.e., from side to side of vehicle hood 2. Indentation 11 is formed in inner panel 3 in such a way that it projects from the inner surface of inner panel 3 upward. At the indentation 11, the distance from the inner surface of inner panel 3 to the inner surface of outer panel 4 is smaller than at other places. Indentation 11 is located in what is referred to as a central region, or middle portion, of the inner panel 3 and divides the inner panel into a front region, between the front end of vehicle body 1 and the indentation 11, and a rear region, between the indentation 11 and the windshield 9 of the vehicle.

The impact of a head on crash causes the middle part of the vehicle hood 2 to bend. A metallic hinge reinforcement, in the form of a plate, is generally designated by reference number 12 and is attached to laterally opposite side locations in the rear region of the inner panel 3 so that the hood 2 is supported, in the open or closed position, by hinges 18 connected to the hood and to the body of the vehicle. The hinge reinforcement 12 is L-shaped in cross-section, includes substantially flat portion 12f and upstanding flange portion 12u, and extends in the longitudinal direction of the vehicle. The rear end part of the hinge reinforcement 12 is placed near the rear end part of the hood 2, adjacent to the peripheral location at which the inner panel 3 and the outer panel 4 are connected, and the front end part of the hinge reinforcement 12 is placed between the rear end part of the hood 2 and the indentation 11.

Referring to FIGS. 3 and 4, it can be seen that the rear side part of the upper surface of the inner panel 3 is equipped with a short rib 13 which extends longitudinally from the forward end of the hinge reinforcement 12 to the indentation 11. The short rib 13 is formed so as to be substantially equal in height to the indentation 11. More specifically, the short rib 13 and the indentation 11 project upwardly from inner panel 3 the same distance.

At opposite locations on the inner panel 3 between each side hole and the central hole 6, the indentation 11 and the rear edge of the inner panel are connected by a long rib 14, which also is substantially equal in height to the indentation 11.

The rear part of the hood 2, i.e., that part of hood 2 located, in the longitudinal direction of the vehicle, between the indentation 11 and the windshield 9, is reinforced by the hinge reinforcement 12, the shorter rib 13, and the longer rib 14. As a result, the rear region or part of the hood, generally referred to by reference number 15, is more rigid and thus stronger than that portion of the hood between the indentation 11 and the front end of the vehicle, i.e., the front region or part of the hood. Moreover, the front slope 16 of the indentation 11 is properly reinforced with a connecting rib 17 which extends in the longitudinal direction of the hood 2. Connecting rib 17 further strengthens the indentation and insulates rear region 15 of the hood from the force produced by a head on collision.

Referring again to FIG. 2, a hinge 18 is attached, at opposite lateral locations on the hood, to the lower surface of the inner panel 3. The hinge reinforcement 12 has two annular flanges, or tubes, 12a projecting perpendicularly from its surface. The tubes 12a extend through corresponding holes 3a formed in the inner panel 3. Each of the hinges 18 also has a hole 18a formed therein. As is apparent from FIG. 3, when the hood 2 is assembled, tubes 12a, holes 3a and holes 18a are coaxially aligned. A bolt 20 is provided and extends through each hole 3a, the associated tube 12a, and the associated hole 18a. Each bolt 20 includes a head engaging the respective hinge 18 and is threadedly engaged with a nut 19 to connect each hinge reinforcement 12 together with one of the hinges 18 and to sandwich the inner panel 3 between the hinge reinforcements 12 and the hinges 18. The tube 12a of each hinge reinforcement 12 works as a spacer so the clearance between the hinge reinforcement 12 and the hinge 18, corresponding to the width of inner panel 3, is maintained. In order to properly secure nut 19 and prevent it from becoming loose, a suitable washer 19w is interposed between nut 19 and hinge reinforcement 12.

As is clear from the foregoing, the inventive embodiment illustrated in FIGS. 1-4 has a stronger rear region 15 behind the indentation 11 because the rear region 15 is reinforced by the hinge reinforcement 12, the short rib 13, and the long rib 14, as well as by the connecting rib 17, which properly reinforces the front slope of the fold 11. The impact of a head on crash is consequently obstructed and deflected by the rigidity of stronger region 15 and the rib 17, thus being concentrated in and absorbed by the weaker front region of the hood forward of the indentation 11. The indentation 11 consequently bends, while the rear region 15 of the hood 2 is prevented from bending. The rear region or portion of the hood is, therefore, prevented from moving in a rearward direction and breaking the front windshield, thus improving passenger safety.

Figure 6:
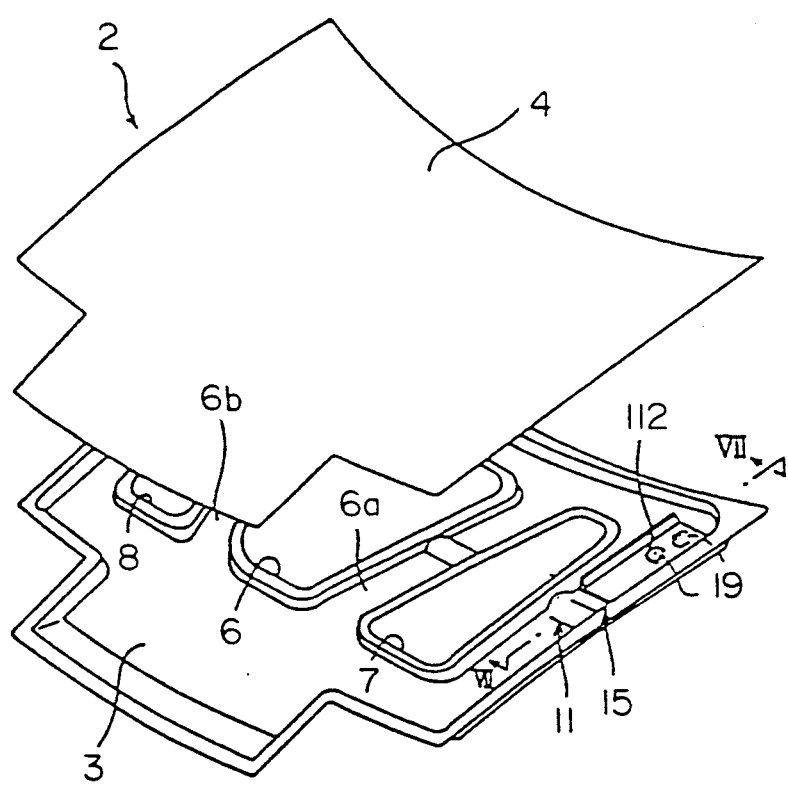
FIG. 6 is a perspective view of an entire hood structure according to a second embodiment of the present invention.

FIGS. 6 and 7 show a hood structure for a vehicle according to a second embodiment of the present invention. The second embodiment differs from the first embodiment in the structure of the stronger rear part or region 15. In the second embodiment, the stronger part 15 is reinforced by the hinge reinforcement 12 itself, which extends toward the rear end of the fold 11, rather than by ribs, such as ribs 13 and 14 of the first embodiment. In this embodiment, the hinge reinforcement 12 alone reinforces the rear portion of the hood 2. Again, the rear portion of the hood, i.e., that portion of the hood between the windshield and the indentation 11, is prevented from bending because of the reinforcement. In this embodiment, the inner panel 3 and the outer panel 4 are made of synthetic resin; however, these panels can also be made of metal.

The foregoing is to be considered a description of the preferred embodiments of the invention only. Variations in the preferred embodiments described above may be apparent to those skilled in the art. It is intended that such variations be covered by the appended claims, together with the preferred embodiments specifically disclosed.

What is claimed is:

1. An impact absorbing hood structure for a front hood located between a front end and a windshield of a vehicle comprising:

at least one panel extending in both longitudinal and lateral directions of the front hood, a laterally extending indentation provided in a central region of the front hood, said indentation dividing said front hood longitudinally into a stronger part between the windshield and the indentation and a weaker part between the vehicle front end and the indentation, said stronger part having a higher rigidity than the weaker part so that the front hood is bent and folded by a crash impact at the indentation, the front hood including an outer panel and an inner panel secured to said outer panel, the indentation and the stronger part being provided on the inner panel, the stronger part extending from a rear end part of the inner panel adjacent said windshield to the indentation and including at least one metallic reinforcement plate attached to the inner panel, and a hinge component for pivotally mounting the front hood on said vehicle, the metallic reinforcement plate having a tube portion projecting through a hole in said inner panel, said tube portion working as a spacer and maintaining a clearance between said metallic reinforcement plate and said hinge component corresponding to the width of the inner panel.

2. An impact absorbing hood structure for a front hood located between a front end and a windshield of a vehicle comprising:

an outer hood panel, an inner hood panel, spaced from and disposed under the outer hood panel, said outer hood panel and said inner hood panel each extending in both longitudinal and lateral directions of the front hood, and a laterally extending indentation provided in a central region of the front hood, said indentation dividing said front hood longitudinally into a stronger part, between the windshield and the indentation, and a weaker part, between the vehicle front end and the indentation, said stronger part having a higher rigidity than the weaker part so that the front hood is bent and folded by a crash impact at the indentation, said stronger part including a hinge reinforcement and a reinforcement rib provided on the inner hood panel in the longitudinal direction, the reinforcement rib projecting from an inner surface of the inner hood panel upward and extending, in the longitudinal direction, from a rear end of the indentation to a portion thereof adjacent a front edge of the hinge reinforcement, the higher rigidity being provided by both the reinforcement rib and the hinge reinforcement, the inner hood panel being made from synthetic resin material, said hinge reinforcement comprising a hinge component and at least one metallic reinforcement plate attached to the inner hood panel, said metallic reinforcement plate having a tube portion projecting through a hole in said inner panel, and said tube portion working as a spacer and maintaining a clearance between said metallic reinforcement plate and said hinge component corresponding to the width of the inner panel.

* * * * *